United States Patent [19]

Senzai et al.

[11] 4,168,403
[45] Sep. 18, 1979

[54] KEY TELEPHONE SYSTEM COMPRISING ONLY ONE CONTROL LEAD PER OUTSIDE LINE

[75] Inventors: Mamoru Senzai; Tatsuya Kato, both of Tokyo, Japan

[73] Assignee: Nippon Electric Co., Ltd., Tokyo, Japan

[21] Appl. No.: 874,088

[22] Filed: Feb. 1, 1978

[30] Foreign Application Priority Data

Feb. 1, 1977 [JP] Japan ................................. 52-10409

[51] Int. Cl.$^2$ ............................................. H04Q 5/20
[52] U.S. Cl. ................................................ 179/99 H
[58] Field of Search ................... 179/99, 81 C, 18 FA

[56] References Cited
U.S. PATENT DOCUMENTS

| | | | |
|---|---|---|---|
| 3,453,396 | 7/1969 | Lacey et al. | 179/99 |
| 3,739,104 | 6/1973 | O'Neill | 179/99 |
| 3,748,403 | 7/1973 | Schartmann et al. | 179/99 |
| 3,860,763 | 1/1975 | Sudoh et al. | 179/99 |
| 4,024,353 | 5/1977 | Hijikata | 179/99 |
| 4,081,625 | 3/1978 | Hamatani et al. | 179/99 |

Primary Examiner—Kathleen H. Claffy
Assistant Examiner—Gerald A. Brigance
Attorney, Agent, or Firm—Sughrue, Rothwell, Mion, Zinn and Macpeak

[57] ABSTRACT

A key telephone system for a predetermined number of outside lines comprises only one control lead shared per outside line by cables connected between a key service unit and key telephone sets, respectively. Each telephone set has manually operable keys for supplying a higher voltage to a relevant control lead while an outside line is selected for an answer or a reanswer to a call present thereon and substituting a lower voltage for the higher voltage when it is desired to hold an answered call. Associated with each outside line and with the control lead therefor, the service unit comprises a unit comprising, in turn, a signal producing circuit for producing a first and a second intermittent signal while a call present on the associated line is not yet held and placed on hold, respectively, a supply circuit supplied with each intermittent signal for supplying a corresponding one of a flashing and a winking signal to the associated lead, a detector for detecting noncorrespondence of a signal supplied to the supply circuit and a signal supplied to the associated lead to produce a control signal, and a hold circuit responsive to the lower voltage supplied to the associated lead for holding the call. The control signal stops production of the first intermittent signal and takes the call off hold when produced while the call is not yet held and placed on hold, respectively. Outside line status indicating lamps are connected in each telephone set to the respective control leads.

6 Claims, 2 Drawing Figures

KEY TELEPHONE SYSTEM COMPRISING ONLY ONE CONTROL LEAD PER OUTSIDE LINE

BACKGROUND OF THE INVENTION

This invention relates to a key telephone system to be connected to a predetermined number of outside lines, which may either be subscriber lines connected to a central office or station lines connected to a private branch exchange.

A key telephone system generally comprises a key service unit, a plurality of key telephone sets, and a cable serving as an intercom line or path between the key service unit and each telephone set. The key service unit is usually connected to several outside lines. Each telephone set customarily comprises lamps for visually indicating various status, such as idle, calling, held, and busy status, of the respective outside lines. Use is made also of at least one more lamp for intercom calls. Each lamp, as called herein, may be a light emitting diode.

In a conventional key telephone system, each cable comprises a number of core conductors as mentioned to in, for example, U.S. Pat. No. 3,725,601 because each cable has to comprise, besides conductors or leads connected to the respective outside lines through the key service unit, various control and lamp leads for allowing any one of the telephone sets to select one of the outside lines, place an outside call present on an outside line on hold, and lighting a pertinent lamp in every telephone set according to the status of the respective outside lines. This has raised the costs of manufacture and installation of the key telephone system.

SUMMARY OF THE INVENTION

It is therefore an object of the present invention to provide a key telephone system wherein the number of core conductors in each cable is rendered small to reduce the costs of manufacture of the system and installation thereof.

It is another object of this invention to provide a key telephone system of the type described, which is capable of fulfilling conventional requisites to a key telephone system by the use of only one control lead per outside line in each cable.

According to this invention, there is provided a key telephone system comprising a key service unit for connection to a predetermined number of outside lines, a plurality of key telephone sets, and cables between the key service unit and the respective telephone sets. The cables share those control leads in common which are assigned to the respective outside lines. Each of the telephone sets comprises first potential means for selectively supplying a first potential signal to a selected one of the control leads and second potential means for substituting a second potential signal for the first potential signal. The key service unit comprises key telephone units for the respective outside lines. The key telephone unit for each outside line comprises intermittent signal producing means to be coupled to the above-mentioned each outside line for producing a first and a second intermittent signal while an outside call present on that outside line is not yet held and placed on hold, respectively, and signal supplying means having an input and an output terminal connected to the intermittent signal producing means and a relevant one of the control leads that is assigned to the above-mentioned each outside line, respectively, for supplying a third and a fourth intermittent signal to the relevant control lead in response to the first and the second intermittent signals, respectively. The third and the fourth intermittent signals correspond to the first and the second intermittent signals, respectively. The key telephone unit further comprises line selection detecting means connected to the input terminal and the relevant control lead for detecting correspondence of a first input signal supplied to the input terminal to a second input signal supplied to the relevant control lead to produce a line selection detection signal when the first and the second input signals do not correspond to each other, holding means connected to the relevant control lead and to be coupled to the above-mentioned each outside line for holding the outside call in response to the second potential signal supplied to the relevant control lead, first means connected to the line selection detecting means and the intermittent signal producing means for stopping production of the first intermittent signal in response to the line selection detection signal produced while the outside call is not yet held, and second means connected to the line selection detecting means and the holding means for taking the outside call off hold in response to the line selection detection signal produced while the outside call is placed on hold.

The predetermined number may be only one. The third and the fourth intermittent signals supplied to a control lead may or may not be different in amplitude from the corresponding intermittent signals produced by the intermittent signal producing means of the key telephone unit for the outside line to which that control lead is assigned. The intermittent signal producing means of the key telephone units for the respective outside lines may comprise a common intermittent signal generator for always generating a fifth and a sixth intermittent signal corresponding to the first and the second intermittent signals, respectively, and a signal switch connected to the signal generator and to be coupled to the respective outside lines for producing the first and the second intermittent signals while an outside call present on the coupled outside line is not yet held and placed on hold, respectively. It is usual that the cables comprise, besides the common control leads, a common power supply lead and a common return lead and that each cable comprises conductor pairs for connecting the telephone set connected to that cable to the respective outside lines through the key service unit. The cables for several adjacently located telephone sets may comprise a common cable between the key service unit and a point adjacent to the sets and branch cables between the adjacent point and the respective sets provided that the common cable comprises control leads continuous to the control leads in the respective branch cables and conductor pairs between the respective sets and the respective outside lines. As is the case with a conventional key telephone system, it is possible when an outside line is selected at a key telephone set by the first potential signal supplied to the only one control lead for that line to connect the set to that line through the conductor pairs and the key telephone unit, both for that line, for the purpose of either placing an outgoing call on that line or answering or reanswering an incoming call present thereon. At any rate, the only one control lead for each outside line makes it possible to excercise control on that line from any one of the telephone sets and to make lamps and/or other indicators of the telephone sets indicate various status of the respective outside lines.

DESCRIPTION OF THE PREFERRED EMBODIMENTS

Figure 1:
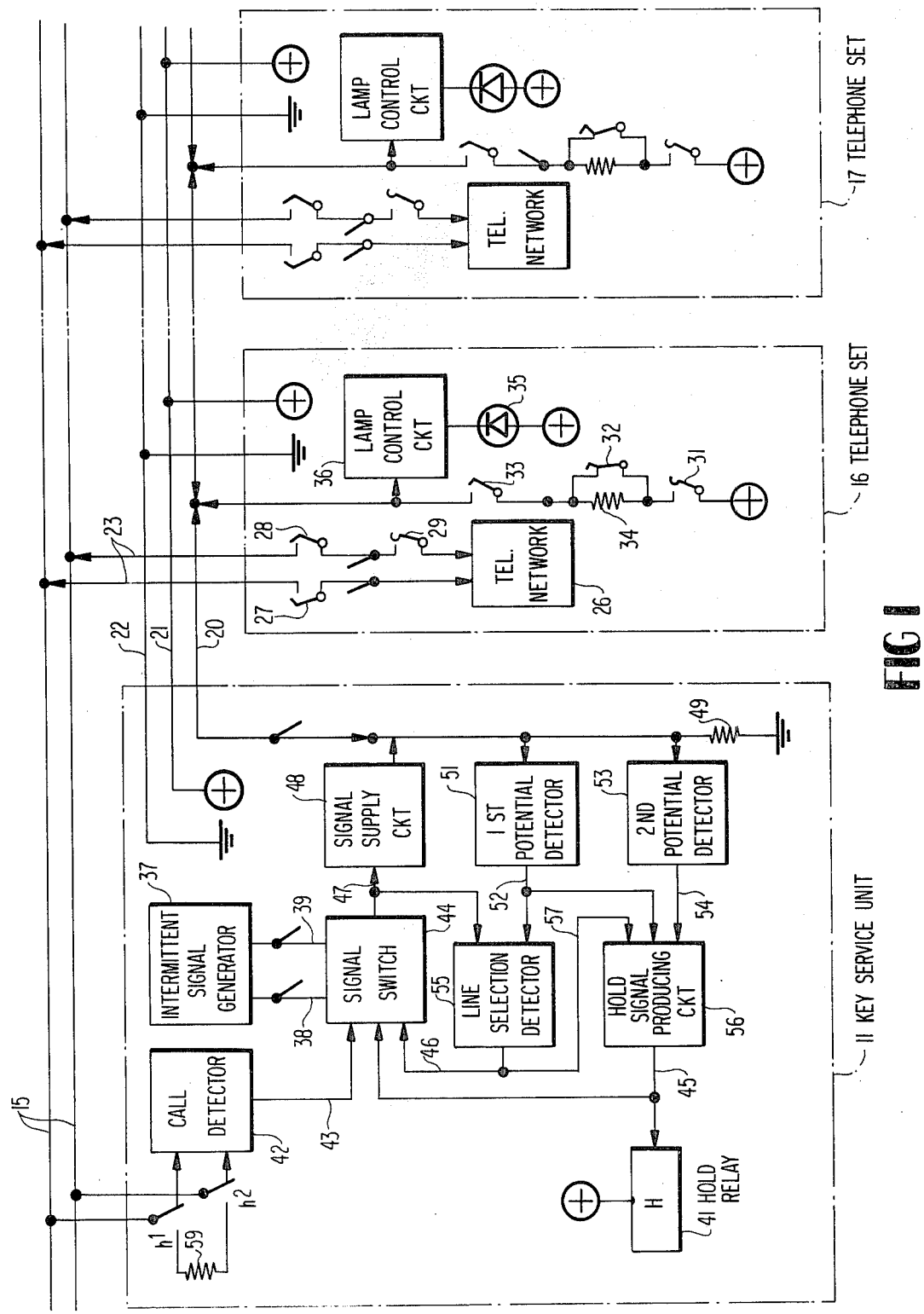
FIG. 1 is a schematic block diagram of a key telephone system according to a preferred embodiment of this invention.

Referring to FIG. 1, a key telephone system according to a preferred embodiment of the instant invention comprises a key service unit 11 connected to a pair of conductors 15 illustrative of an outside line, a plurality of key telephone sets 16 and 17, and cables between the key service unit 11 and the respective telephone sets 16 and 17. The cables share in common a control lead 20 for the outside line 15, a power supply lead 21, and a ground lead 22. Besides the common leads 20 through 22, the cable connected to the telephone set 16 comprises a conductor pair 23 that is connected in practice to the outside line 15 through the key service unit 11 but is herein connected directly to the outside line 15 merely for simplicity of illustration.

The telephone set 16 illustrated in FIG. 1 comprises a telephone set network 26, first and second make contacts 27 and 28 of a line selection key or pushbutton (not shown) for the outside line 15 between the network 26 and the conductor pair 23, a first make contact 29 of a hook switch (not shown) between the network 26 and one of the line selection key contacts 27 and 28. In the telephone set 16, a second make contact 31 of the hook switch is connected to the power supply lead 21. A break contact 32 of a hold key or pushbutton (not shown) common to the outside lines, such as 15, is connected to the second hook switch contact 31. A third make contact 33 of the line selection key is interposed between the hold key contact 32 and the common control lead 20. A shunt resistor 34 shunts the hold key contact 32. The telephone set 16 further comprises a lamp 35 for the outside line 15 connected to the power supply lead 21 and a lamp control circuit 36 between the lamp 35 and the common control lead 20.

The key service unit depicted in FIG. 1 comprises a signal generator or interrupter 37 for always generating and supplying a first and a second intermittent signal to a first and a second intermittent signal line 38 and 39, respectively, and a key telephone unit between the outside line 15 and the control lead 20 for that line 15. The first and the second intermittent signals are of a flashing and a winking frequency, respectively. It should be understood, when the key service unit 11 is to be connected to a plurality of outside lines, that the cables share control leads for the respective outside lines in common, that each cable comprises conductor pairs for the respective outside lines, that each telephone set comprises line selection keys, lamps, and lamp control circuits for the respective outside lines, and that the key service unit 11 comprises key telephone units for the respective outside lines. The line selection keys are usually locking keys while the hold key is a non-locking key. Preferably, the hold key is mechanically coupled to the line selection keys so as to release, when operated and then released, a previously operated one of the line selection keys. Other telephone sets, such as 17, and cables therefor are similar in structure to the above-described telephone set 16 and the cable connected thereto. During closure in any one of the telephone sets, such as 16, of the second hook switch contact 31 and the third line selection key contact 33, the control lead 20 connected thereto is supplied with a first potential signal of a first level nearly equal to the power supply potential. When the hold key contact 32 is opened under the circumstances, the control lead 20 is supplied with a second potential signal of a second level between the power supply potential and ground as will become clear later. The lamp control circuit 36 lights the lamp 35 whenever the control lead 20 is supplied with a potential substantially equal to the first level.

Further referring to FIG. 1, the key telephone unit for the depicted outside line 15 comprises a hold or H relay 41 responsive to a hold signal for holding an outside call present on the outside line 15 in the manner described hereunder. In the key telephone unit, a call detector 42 is coupled to the outside line 15 through a pair of transfer contacts $h^1$ and $h^2$ of the hold relay 41 to supply a call detection signal to a call detection signal line 43 while an outside call present on the outside line 15 is not yet held. A signal switch 44 is connected to the intermittent signal lines 38 and 39, the call detection signal 43, a hold signal line 45 for the hold signal, and a control signal line 46 to allow the first and the second intermittent signals to pass therethrough to an intermediate line 47 during presence of a call detection signal on the call detection signal line 43 and of a hold signal on the hold signal line 45, respectively. The control signal line 46 will be described later. A signal supply circuit 48 has an input and an output terminal connected to the intermediate line 47 and the control lead 20, respectively, to unidirectionally transfer the first and the second intermittent signals from the intermediate line 47 to the control lead 20 as a flashing and a winking signal, respectively. The flashing and the winking signals correspond to the first and the second intermittent signals, respectively, and vary substantially between the first level and ground. The key telephone unit further comprises a series resistor 49 between the control lead 20 and ground for providing the second level in cooperation with the series resistor 34.

Still further referring to FIG. 1, the key telephone unit comprises a first potential detector 51 for detecting the electric potential supplied to the control lead 20 to supply a first detection signal to a first detection signal line 52 whenever the potential of the control lead 20 is rendered substantially equal to the first level. It follows therefore that, when the flashing and the winking signals are transferred to the control lead 20, the first detection signal intermittently appears even though the second potential signal is partly superposed thereon. In the key telephone unit, a second potential detector 53 is for detecting the potential of the control lead 20 to supply a second detection signal to a second detection signal line 54 when the potential in question is rendered substantially equal to the second level. A line selection detector 55 is connected to the intermediate line 47 and the first detection signal line 52 to produce a line selection detection signal each time the outside line is selected, namely, while the first detection signal line 52 is steadily supplied with the first detection signal, and to stop production of the line detection signal while a signal present on the intermediate line 47 is coincident with a signal supplied to the first detection signal line 52. The line selection detector 55 thus produces a line selection detection signal when a signal placed on the intermediate line 47 does not correspond to a signal supplied to the control lead 20. For example, the line selection detection signal is not produced when no signal is present on both of the intermediate and the first detection signal lines 47 and 52. Exact correspondence occurs when the second potential signal is immediately put out after substitution on the control lead 20 for the first potential signal. A hold signal producing circuit 56 is connected to the first and the second detection signal lines 52 and 54 to supply a hold signal to the hold signal line 45 when the second potential signal is substituted for the first potential signal. The line selection signal is supplied as a control signal to the control signal line 46 to stop passage of the first intermittent signal through the signal switch 44 and as a reset signal to the hold signal producing circuit 56 through a reset signal line 57 to stop production of the hold signal. During presence of a hold signal, the hold relay 41 is energized whereby the hold relay contacts $h^1$ and $h^2$ are transferred to connect a hold resistor 59 to the outside line 15 to hold the outside call present thereon.

In operation, it may be mentioned here that each telephone set comprises station selection keys or pushbuttons (not shown) for the other telephone sets of the key telephone system. Merely for convenience of description, it is presumed in the following that keys are used and that each key is put into operation when depressed. When the key telephone system is in a rest or idle state, no signal is supplied to both of the intermediate line 47 and the control lead 20. Consequently, the signal switch 44 is free to transfer whichever of the first and the second intermittent signals from a pertinent one of the first and the second intermittent signal lines 38 and 39 to the intermediate line 47.

Responsive to an incoming call supplied from a subscriber's station (not shown) of a calling party to the outside line 15, the call detector 42 makes the signal switch 44 supply the first intermittent signal to the intermediate line 47. The signal supply circuit 48 supplies the flashing signal to the common control lead 20 to make the lamp control circuits, such as 36, flash the lamps, such as 35, assigned to the outside line 15 in the respective telephone sets. Buzzers or the like (not shown) in the respective telephone sets may also inform users of the key telephone system of the incoming call. Although the first detection signal line 52 is now supplied intermittently with the first detection signal, the first intermittent signal supplied to the intermediate line 47 corresponds to the flashing signal supplied to the control lead 20. The line selection detector 55 therefore produces no line selection detection signal. The signal switch 44 continually supplies the first intermittent signal to the intermediate line 47.

At any one of the telephone sets, for example, at the telephone set 16, the user may answer the incoming call by picking up the known handset (not shown) to go off-hook and by depressing the line selection key indicated by the flashing lamp 35 for the outside line 15. The first potential signal is supplied to the common control lead 20. At the same time, the network 26 is connected to the outside line 15 to complete a speech path between the telephone set 16 and the subscriber's station of the calling party. The first detection signal line 52 is steadily supplied with the first detection signal. The line selection detector 55 produces a line selection detection signal, which stops as a control signal passage of the first intermittent signal through the signal switch 44 but has no effect on the hold signal producing circuit 56. The lamps, such as 35, for the outside line 15 are steadily lit in the respective telephone sets to indicate the fact that the call is attended to.

If the incoming call is not for the user of the telephone set 16, the user depresses the hold key at first to transfer the call to a proper party. The hold key contact 32 is opened to supply the second potential signal to the common control lead 20. The first detection signal line 52 is now supplied with no signal. The line selection detector 55 stops production of the line selection detection signal to enable the signal switch 44. On the other hand, the second detection signal line 54 is supplied with the second detection signal. The hold signal producing circuit 56 supplies a hold signal to the hold signal line 45 to make the hold relay 41 hold the outside line 15 in cooperation with the hold resistor 59 and to make, at the same time, the signal switch 44 supply the second intermittent signal to the intermediate line 47. Due to the winking signal supplied to the control lead 20, the first detection signal line 52 is now supplied intermittently with the first detection signal. In the meanwhile, the hold key is released to turn the second potential signal off. The exact coincidence of the second intermittent signal supplied to the intermediate line 47 with only the winking signal supplied to the control lead 20 keeps the line selection detector 55 in the state of producing no signal and the signal switch 44 in the state of continually producing the second intermittent signal. By means of the lamp control circuits, such as 36, the winking signal makes the lamps, such as 35, for the held outside line 15 wink in the respective telephone sets. With the call placed on hold, the user at the telephone set 16 informs the proper party of the call by depressing the corresponding station selection key and by talking to the proper party through an intercom speech path established when the proper party picks up the handset.

At the telephone set of the proper party, the user reanswers the incoming call by depressing the line selection key for the outside line 15 indicated by the winking lamp and, as the case may be, also by the outside line number announced by the user of the telephone set 16. The first potential signal is again supplied to the common control lead 20. The line selection detector 55 produces another line selection detection signal, which inhibits production of the hold signal to take the incoming call off hold and to stop passage of the second intermittent signal through the signal switch 44. The lamps, such as 35, go steady. The user at the telephone set 16 may put the handset back.

At the end of a conversation, the user may either put the handset back or release the line selection key for the outside line which was being used. No signal is supplied to the control lead 20 and to the intermediate line 47. The line selection detection signal disappears to enable the signal switch 44. The lamps, such as 35, go off. The key telephone system is again in the rest state and is ready for another call.

Figure 2:
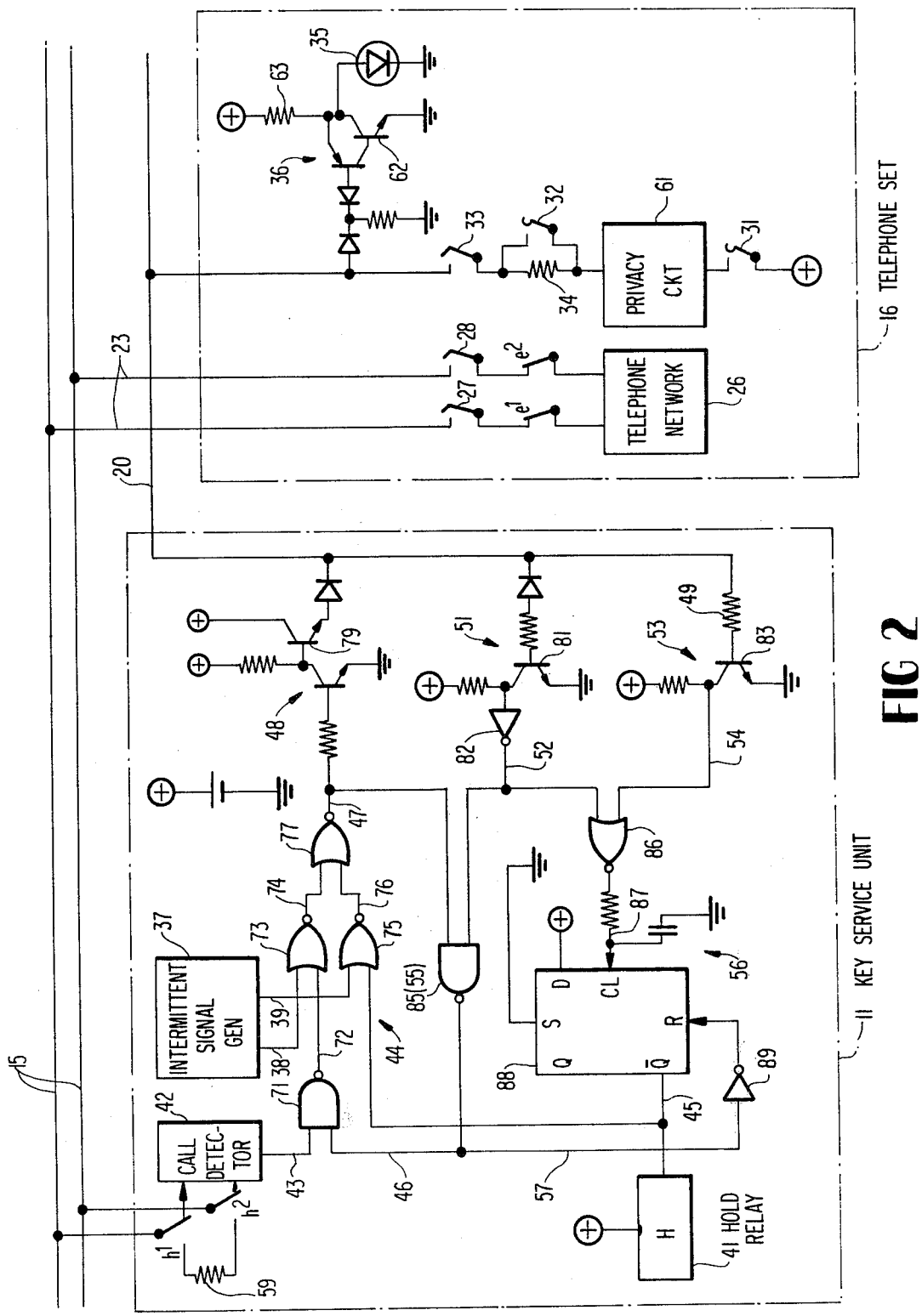
FIG. 2 schematically shows, partly in blocks, a detailed circuit diagram of a key telephone system according to a more preferred embodiment of this invention.

Referring now to FIG. 2, a key telephone system according to a more preferred embodiment of this invention comprises similar parts designated by like reference numerals as in FIG. 1. Merely for simplicity of illustration, the power supply lead 21 (FIG. 1) is illustrated by encircled crosses depicted here and there. The ground lead 22 is represented by the symbols for ground. In connection with the illustrated key telephone system, it may be mentioned here that the common control leads, such as 20, are normally put in a high impedance state. For logic elements that become clear as the description proceeds, use is made of signals of a high and a low level that may be, for example, substantially equal to the power supply potential and ground, respectively.

In the telephone set 16 depicted in FIG. 2, a conventional privacy circuit 61 is interposed between the second hook switch contact 31 and the hold key contact 32. Break contacts $e^1$ and $e^2$ of a known E relay (not shown) are substituted for the first make contact 29 (FIG. 1) of the hook switch. These modifications apply to other telephone sets (not shown in FIG. 2). The lamp control circuit 36 comprises, among others, a transistor 62 and a load resistor 63 connected in series at a point of connection between the power supply lead 21 and ground. The base electrode of the transistor 62 is coupled to the control lead 20. The light emitting diode 35 is connected between the point of connection and ground. When the control lead 20 is put in the high impedance state, the transistor 62 is rendered conductive not to light the lamp 35. When the control lead 20 is supplied with the high level, the transistor 62 is cut off to light the lamp 35.

In conjunction with the key service unit 11 illustrated in FIG. 2, it may be mentioned at first that the call detection signal is given by a signal of the high level on the call detection signal line 43, that each of the first and the second intermittent signals alternatingly has the high and the low levels, that the hold signal line 45 is given the low level upon appearance of a hold signal, and that the control and the reset lines 46 and 57 are given the low level during presence of each line selection detection signal. In the depicted key telephone unit, the signal switch 44 comprises a NAND gate 71 having inputs connected to the call detection signal line 43 and the control signal line 46 and an output connected to an enabling line 72, a first NOR gate 73 having inputs connected to the first intermittent signal line 38 and the enabling line 72 and an output connected to a first control connection 74, a second NOR gate 75 having inputs connected to the second intermittent signal line 39 and the hold signal line 45 and an output connected to a second control connection 76, and a third NOR gate 77 having inputs connected to the first and the second control connections 74 and 76 and an output connected to the intermediate line 47. In the absence of the line selection detection signal, the call detection signal gives the low level to the enabling line 72. The first intermittent signal is supplied to the first control connection 74 with the phase reversed. On the other hand, the hold signal line 45 is rendered high to keep the second control connection 76 low. The intermediate line 47 is therefore supplied with the first intermittent signal. When produced, a line selection detection signal renders the enabling line 72 high to keep the first control connection 74 low. This holds the intermediate line 47 high. When produced, a hold signal makes the second intermittent signal appear on the second control connection 76 with the phase reversed. At this instant, the first control connection 74 is rendered low by a preceding line selection detection signal. Although the call detection signal disappears as a result of transfer of the hold relay contacts $h^1$ and $h^2$, the first control connection 74 is kept low. The intermediate line 47 is therefor supplied with the second intermittent signal. When produced for a second time, the line selection detection signal renders the enabling line 72 high to place the low level on the first control connection 72. This renders the intermediate line 47 high.

Further in the key telephone unit illustrated in FIG. 2, the signal supply circuit 48 comprises a transistor 79 as a main element between the intermediate line 47 and the control lead 20. When the intermediate line 47 is given the high level, the transistor 79 is cut off to put the control lead 20 in the high impedance state. When the intermediate line 47 is given the low level, the transistor 79 is rendered conductive to give the control lead 20 the first level. The first potential detector 51 comprises a transistor 81 that supplies its output signal to the first detection signal line 52 through an inverter 82. When the control lead 20 is supplied with the first level, the transistor 81 is rendered conductive to supply the first detection signal line 52 with the high level as the first detection signal. When the control lead 20 is put in the high impedance state or supplied with the second level, the transistor 81 is cut off to supply the low level to the first detection signal line 52. The second potential detector 53 comprises a transistor 83 that is rendered on while the control lead 20 is supplied with whichever of the first and the second levels to supply the second detection signal line 54 with the low level as the second detection signal and is cut off while the control lead 20 is put in the high impedance state to put the high level on the second detection signal line 54. The series resistor 49 is herein connected between the control lead 20 and the base electrode of the second potential detector transistor 83. The line selection detector 55 comprises a NAND gate 85 having inputs connected to the intermediate line 47 and the first detection signal line 52 and an output connected to a common line branching into the control and the reset signal lines 46 and 57. The hold signal producing circuit 56 comprises a NOR gate 86 having inputs connected to the first and the second detection signal lines 52 and 54 and an output connected to a set signal line 87. The circuit 56 further comprises a D-type flip-flop 88 having a clock terminal CL coupled to the set signal line 87, a D terminal supplied with a positive voltage, a set output terminal Q left idle, a reset output terminal $\overline{Q}$ connected to the hold signal line 45, a set input terminal S grounded, and a reset input terminal R connected to the reset signal line 57 through an inverter 89.

As described hereinabove in conjunction with the signal switch 44 shown in FIG. 2, the intermediate line 47 is kept at the high level when no signal is supplied thereto. The flip-flop 88 is in the reset state. When supplied with the first intermittent signal, the intermediate line 47 is alternatingly rendered high and low. When the first potential signal is supplied to the control lead 20 to render the first detection signal line 52 high, the line selection detector NAND gate 85 supplies an instantaneous signal of the low level to the control and the reset signal lines 46 and 57 as soon as the intermediate line 47 is instantaneously rendered high. This places the high level on the enabling line 72, the low level on the first control connection 74, and the high level on the intermediate line 47. The timing is such that the intermediate line 47 is supplied with the last-mentioned high level when the first intermittent signal supplied thereto would otherwise give the low level thereto. The line selection detection signal is thus produced to stop passage of the first intermittent signal through the signal switch 44. On the other hand, the instantaneous low level of the line selection detection signal has no effect on the already reset flip-flop 88.

When the hold key is depressed in any one of the telephone sets of the key telephone system illustrated in FIG. 2, the second level substituted for the first level on the control lead 20 common for the depicted outside line 15 to the telephone sets gives the low level to both of the first and the second detection signal lines 52 and 54. This turns the set signal line 87 high. The flip-flop 88 is set to give the low level to the hold signal line 45 to thereby enable the second NOR gate 75. On the other hand, the line selection detection signal disappears to render the control signal line 46 high. The call detection signal line 43, however, is rendered low due to transfer of the hold relay contacts $h^1$ and $h^2$. The enabling line 72 is given the high level to place the low level on the first control connection 72. The second intermittent signal thus supplied to the intermediate line 47 continues until the hold signal disappears to disable the second NOR gate 75. More particularly, the line selection detection signal produced in response to a reanswer to the call placed on hold gives the low level to the control and the reset signal lines 46 and 57. The enabling line 72 is kept at the high level. The first detection signal line 52 is turned to high while the second detection signal line 54 is kept high. The set signal line 87 is rendered low. On the other hand, the low level placed on the reset signal line 57 resets the flip-flop 88 through the accompanying inverter 89 to turn the hold signal line 45 to the high level.

While a few preferred embodiments of this invention has thus far been described, it is now obviously possible for those skilled in the art to modify the illustrated embodiments in various manners. It is also obvious that a key telephone system according to this invention is capable of carrying out other conventional functions of a usual key telephone system. It may be mentioned at this point that the first potential signal is not necessarily higher in potential or level than the second potential signal because means for discriminating between potentials are well known in the art. The first and the second potential signals may be differentiated from each other by frequency because means are also well known for producing signals of different levels in response to the frequencies thereof. On the other hand, the first and the second intermittent signals or the flashing and the winking signals, as called herein, may be differentiated from each other by potentials or levels thereof.

What is claimed is:

1. A key telephone system comprising a key service unit for connection to a predetermined number of outside lines, a plurality of key telephone sets, and cables between said key service unit and the respective telephone sets;

said cables sharing common power supply and reference voltage level leads, each said cable having one control lead assigned to a corresponding outside line;

each of said telephone sets comprising first potential means for selecting one of said control leads by supplying a first potential signal to the selected control lead and second potential means selectively operable during operation of said first potential means to substitute a second potential signal for said first potential signal;

each said key service unit comprising a key telephone unit for each outside line, each said key telephone unit comprising:

intermittent signal generating means to be coupled to said each outside line for producing, in response to an outside call supplied to said outside line, a first intermittent signal and further coupled to a holding means for producing, in response to a hold signal produced by said holding means, a second intermittent signal;

signal supplying means having an input terminal connected to said intermittent signal producing means for supplying a third and fourth intermittent signal to said corresponding control lead when said input terminal is supplied with said first and second intermittent signals, respectively;

line selection detecting means connected to said input terminal and said corresponding control lead for producing a line selection detection signal when said corresponding control lead is supplied with said first potential signal while said input terminal is supplied with either of said first and second intermittent signals;

said holding means connected to said corresponding control lead and to be coupled to said outside line for producing said hold signal in response to the second potential signal supplied to said corresponding control lead and for thereby holding said outside call;

first means connected to said line selection detecting means and said intermittent signal producing means for stopping production of said first intermittent signal in response to the line selection detection signal produced when said input terminal and said corresponding control lead are supplied with said first intermittent and said first potential signals, respectively; and second means connected to said line selection detecting means and said holding means for stopping production of said hold signal in response to the line selection detection signal produced when said input terminal and said corresponding control lead are supplied with said second intermittent and said first potential signals, respectively, and for thereby taking said outside call off hold.

2. A key telephone system according to claim 1, said first and second potential signals having a first and second level, respectively, different from said reference level, and each of said first and second intermittent signals alternatingly having a high and a low level, wherein:

said signal supplying means comprises means for alternating supplying as each of said third and fourth intermittent signals a signal having substantially said reference level and a signal having substantially said first level when the corresponding one of said first and second intermittent signals has said high and said low levels, respectively;

said line selection detecting means comprising first detecting means connected to said corresponding control lead for producing a first detection signal, said first detecting means providing substantially said high level as said first detection signal when the signal on said corresponding control lead is detected to have substantially said first level, said first detecting means otherwise providing substantially said low level, said line selection detecting means further comprising a line selection detector connected to said input terminal and said first detecting means for producing said line selection detection signal when the respective levels are not substantially equal to each other;

said holding means comprising second detecting means connected to said corresponding control lead for producing a second detection signal, said second detecting means providing substantially said high level as said second detection signal when the signal on said corresponding control lead is detected to have substantially said second level, said second detecting means otherwise providing substantially said low level, said holding means further comprising a hold signal producing circuit connected to said second detecting means and also to said first detecting means for starting production of a hold signal when said first detecting means switches substantially from said high level to said low level while said second detecting means stays at substantially said low level, and a hold relay connected to said hold signal producing circuit and to be coupled to said outside line for holding said outside call in response to said hold signal;

said second means comprising means connected to said line selection detector and said hold signal producing circuit for stopping production of said hold signal in response to a line selection detection signal produced while said outside call is placed on hold.

3. A key telephone system according to claim 2, wherein:

said key service unit further comprises an intermittent signal generator for always generating a fifth and a sixth intermittent signal;

said intermittent signal producing means comprising call detection signal producing means to be coupled to each said outside line for producing a call detection signal, a signal switch connected to said call detection signal producing means and said intermittent signal generator, and a connection between said signal switch and said hold signal producing circuit, said signal switch producing said first and said second intermittent signals in response to said fifth intermittent signal supplied thereto during presence of said call detection signal and said sixth intermittent signal supplied thereto during presence of said hold signal, respectively.

4. A key telephone system according to claim 3, said call detecting signal having substantially said high level, wherein:

said signal switch comprises an enabling circuit connected to said call detection signal producing means;

said first means comprising a connection between said enabling circuit and said line selection detector to make said enabling circuit produce an enabling signal in response to the call detection signal produced during absence of the line selection detection signal;

said signal switch further comprising:

a first circuit connected to said enabling circuit and said intermittent signal generator for producing, during presence of said enabling signal, a seventh intermittent signal in response to said fifth intermittent signal and otherwise a first control signal;

a second circuit connected to said hold signal producing circuit and said intermittent signal generator for producing, during presence of said hold signal, an eighth intermittent signal in response to said sixth intermittent signal and otherwise a second control signal; and a third circuit connected to said first and said second circuits for producing substantially said high level to said first input terminal during simultaneous presence of said first and said second control signals and for producing said first and said second intermittent signals in response to said seventh and said eighth intermittent signals, respectively.

5. A key telephone system according to claim 4, wherein said second potential means comprises means for rendering said second level lower than said first level.

6. A key telephone system according to claim 4, wherein said second potential means comprises means for automatically stopping production of said second potential signal immediately following production thereof.

* * * * *